(12) United States Patent
Alnafoosi et al.

(10) Patent No.: US 10,606,700 B2
(45) Date of Patent: Mar. 31, 2020

(54) ENHANCED DISPERSED STORAGE ERROR ENCODING USING MULTIPLE ENCODING LAYERS

(71) Applicant: International Business Machines Corporation, Armonk, NY (US)

(72) Inventors: Ahmad Alnafoosi, Streamwood, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

(21) Appl. No.: 15/804,147

(22) Filed: Nov. 6, 2017

(65) Prior Publication Data
US 2018/0074890 A1    Mar. 15, 2018

Related U.S. Application Data

(63) Continuation-in-part of application No. 15/427,934, filed on Feb. 8, 2017, now Pat. No. 9,813,501, which
(Continued)

(51) Int. Cl.
*G06F 11/10* (2006.01)
*G06F 21/64* (2013.01)
(Continued)

(52) U.S. Cl.
CPC .......... *G06F 11/108* (2013.01); *G06F 9/5027* (2013.01); *G06F 21/64* (2013.01);
(Continued)

(58) Field of Classification Search
CPC ... H04L 63/06; H04W 12/04; G06F 17/30091
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Kyung H Shin
(74) *Attorney, Agent, or Firm* — Garlick & Markison; Timothy W. Markison; Patricia A. Markison

(57) ABSTRACT

A method includes dispersed storage error encoding, by a computing device, a data segment of a data file to produce a set of encoded data slices. The method further includes determining, by the computing device, a storage & error encoding scheme for storing the set of encoded data slices. The method further includes sending, by the computing device, the set of encoded data slices to the set of storage units. The method further includes receiving, by a first storage unit, one or more encoded data slices. The method further includes processing, by the first storage unit, the one or more encoded data slices in accordance with a first version of the storage & erroring encoding scheme to produce a first set of encoded data sub-slices. The method further includes storing, by the first storage unit, the first set of encoded data sub-slices in a set of memory devices.

18 Claims, 11 Drawing Sheets

Related U.S. Application Data is a continuation of application No. 13/959,006, filed on Aug. 5, 2013, now Pat. No. 9,648,087.

(60) Provisional application No. 61/711,106, filed on Oct. 8, 2012.

(51) Int. Cl.
| | |
|---|---|
| *H04L 29/08* | (2006.01) |
| *H04L 12/911* | (2013.01) |
| *G06F 9/50* | (2006.01) |
| *G06F 21/80* | (2013.01) |
| *G06F 3/06* | (2006.01) |

(52) U.S. Cl.
CPC .............. *G06F 21/80* (2013.01); *H04L 47/70* (2013.01); *H04L 67/10* (2013.01); *H04L 67/1097* (2013.01); *H04L 67/32* (2013.01); *G06F 3/067* (2013.01)

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0088976 | A1 | 4/2005 | Chafle et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2010/0268966 | A1* | 10/2010 | Leggette ............ G06F 21/6227 713/193 |
| 2011/0126295 | A1 | 5/2011 | Resch |
| 2011/0265143 | A1* | 10/2011 | Grube ................. G06F 11/0727 726/2 |
| 2011/0314346 | A1* | 12/2011 | Vas ......................... H04L 63/06 714/49 |
| 2012/0054581 | A1* | 3/2012 | Grube ................... G06F 3/0619 714/769 |
| 2013/0179894 | A1 | 7/2013 | Calder et al. |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

(56) References Cited

OTHER PUBLICATIONS

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner

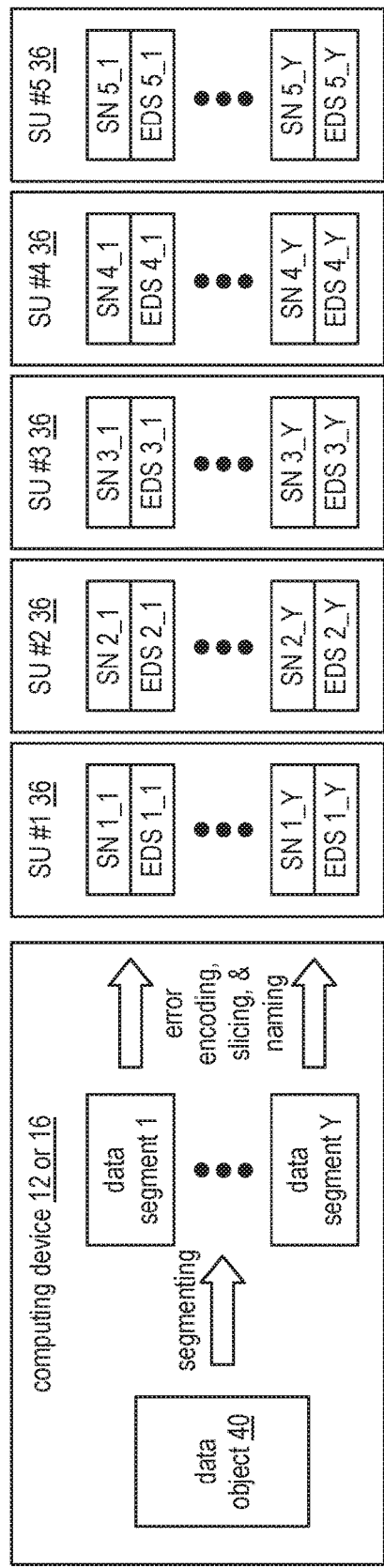
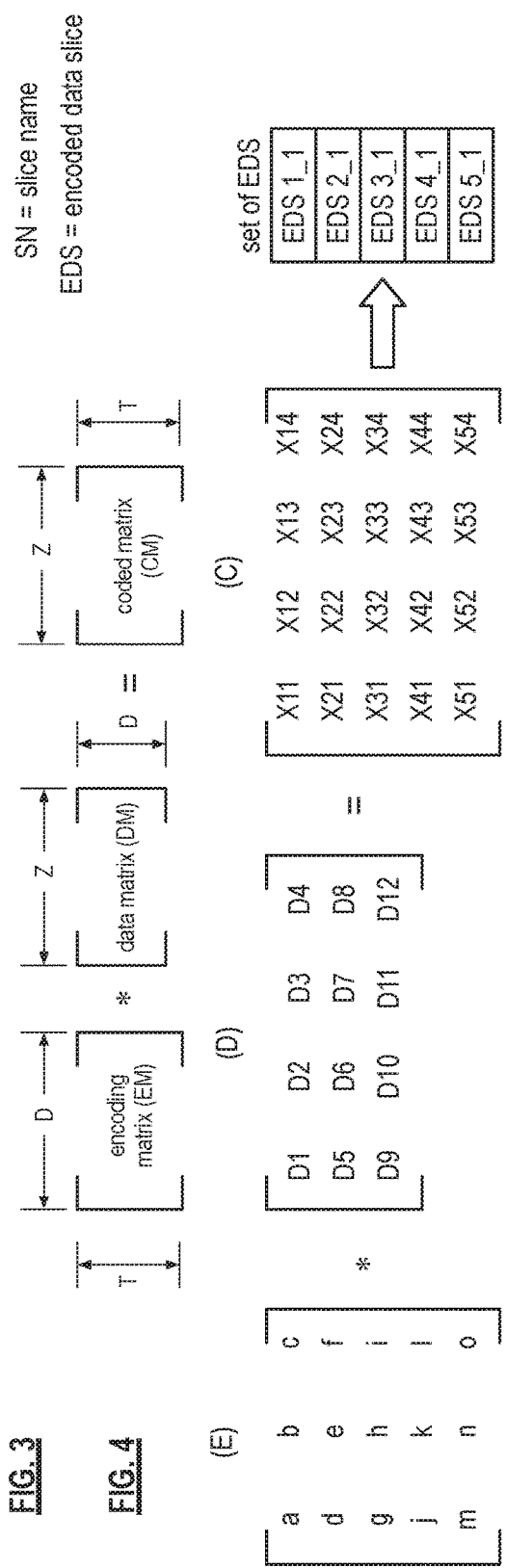
FIG. 3
FIG. 4
FIG. 5
FIG. 6

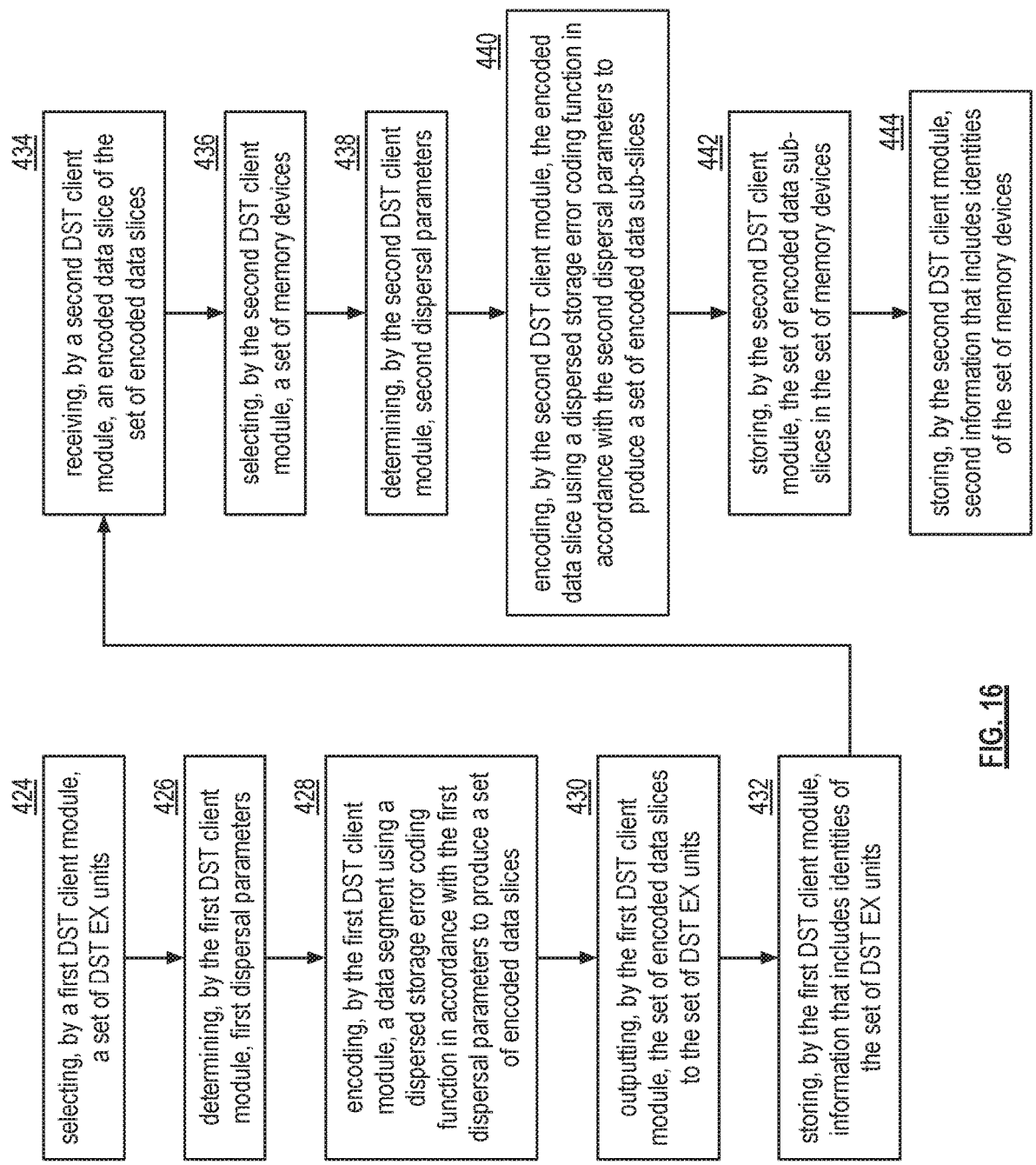

ENHANCED DISPERSED STORAGE ERROR ENCODING USING MULTIPLE ENCODING LAYERS

CROSS REFERENCE TO RELATED PATENTS

This Application claims priority pursuant to 35 U.S.C. § 120, as a continuation-in-part (CIP) of U.S. Utility patent application Ser. No. 15/427,934, entitled "ALLOCATING DISTRIBUTED STORAGE AND TASK EXECUTION RESOURCES," filed Feb. 8, 2017, pending, which claims priority pursuant to 35 U.S.C. § 120, as a continuation to U.S. Utility patent application Ser. No. 13/959,006, entitled "ALLOCATING DISTRIBUTED STORAGE AND TASK EXECUTION RESOURCES," filed Aug. 5, 2013, issued as U.S. Pat. No. 9,648,087 on May 9, 2017, which claims priority pursuant to 35 U.S.C. § 119(e) to U.S. Provisional Application No. 61/711,106, entitled "PRIORITIZING TASKS IN A DISTRIBUTED STORAGE AND TASK NETWORK," filed Oct. 8, 2012, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 16 is a logic diagram of an example of a method of encoding and storing a data segment in accordance with the present invention.

DETAILED DESCRIPTION OF THE INVENTION

Figure 1:
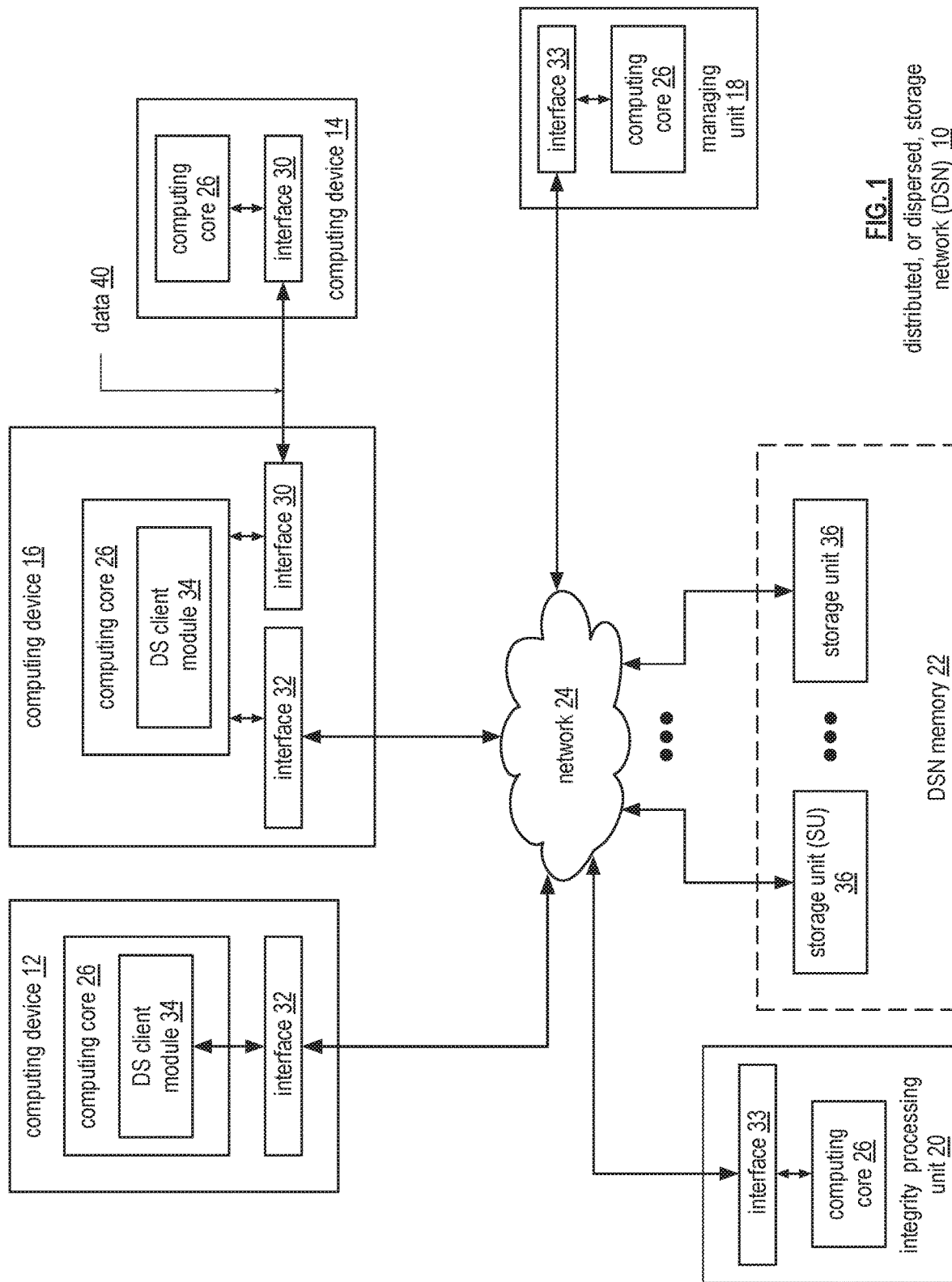
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
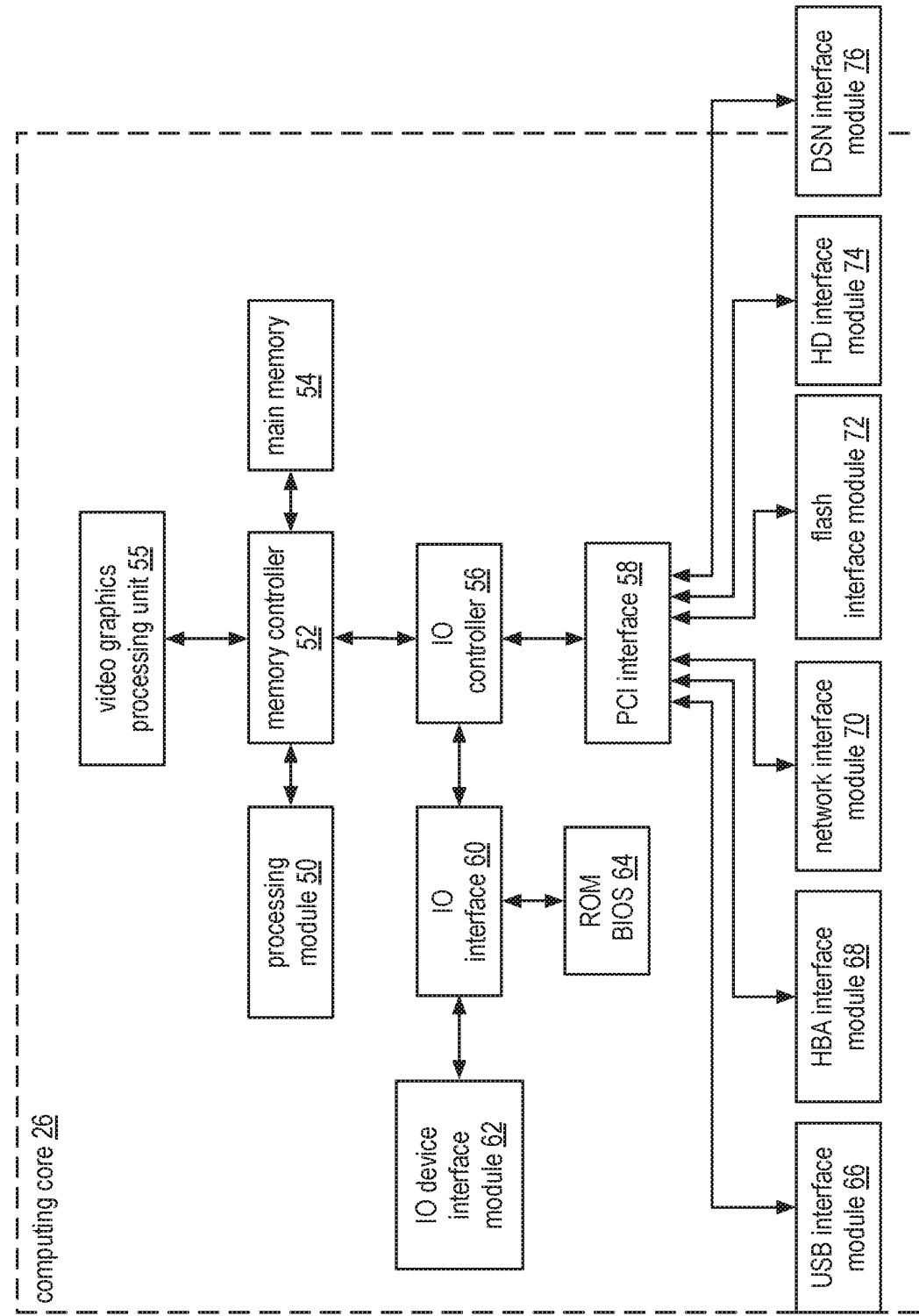
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded data slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
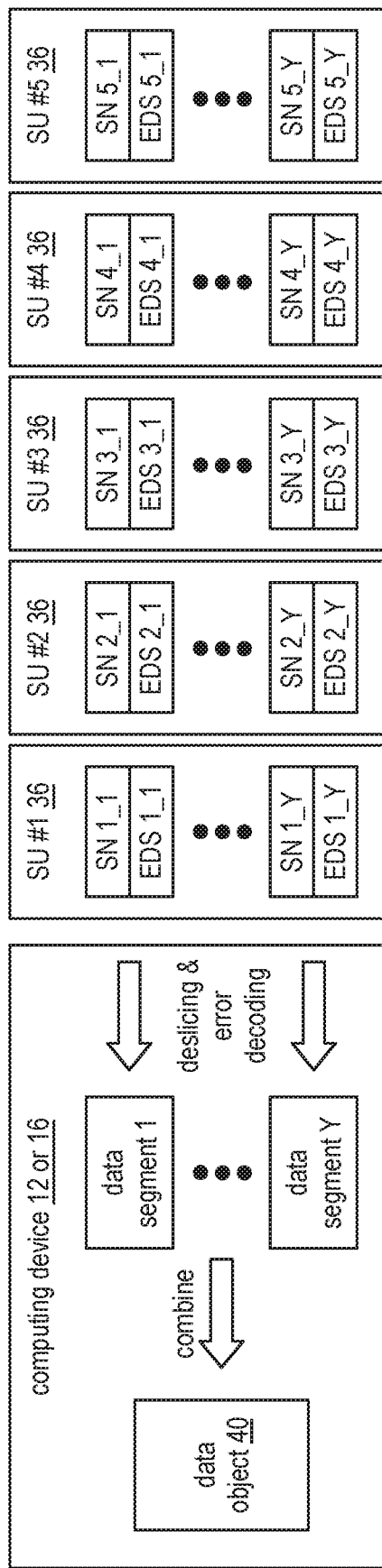
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
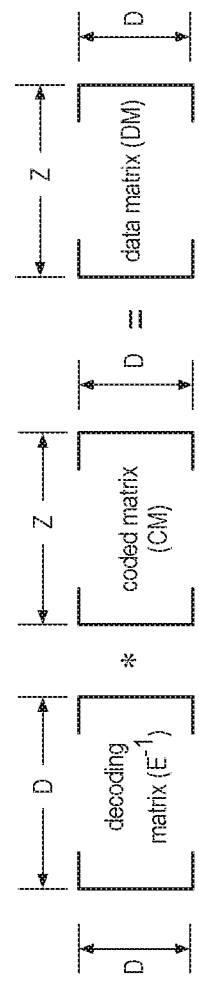
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
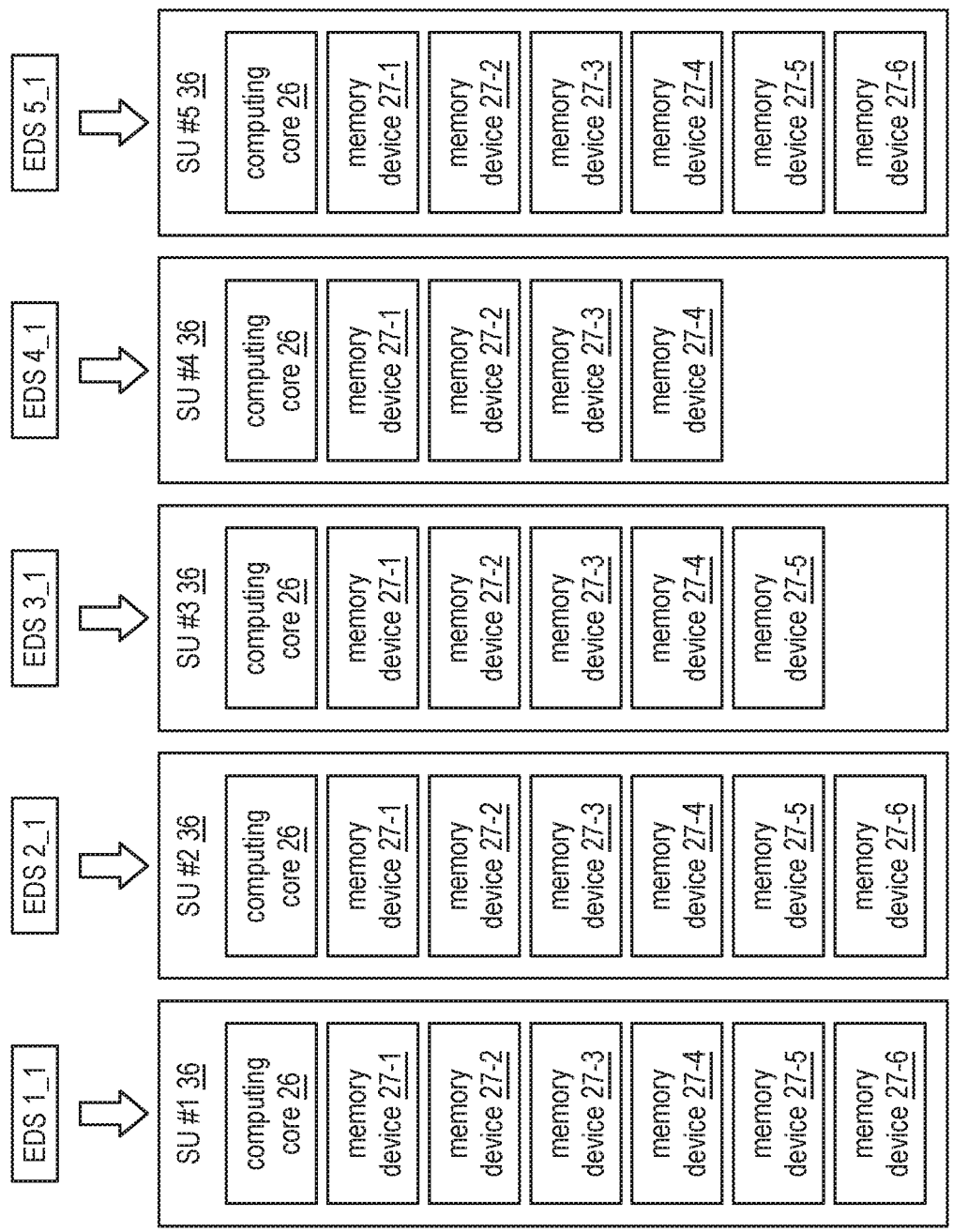
FIG. 9 is a schematic block diagram of an embodiment of a set of storage units in accordance with the present invention.

FIG. 9 is a schematic block diagram of an embodiment of a set of storage units (SU 1-5). Each storage units includes a computing core 26, or portions thereof, and a plurality of memory devices 27-1 through 27-*n*, where n is an integer greater than or equal to 2. Each storage unit may include more of less memory devices than shown and each memory device includes one or more of a hard drive, a solid-state drive, dynamic random access memory, etc.

Each storage unit is shown receiving an encoded data slice of a set of encoded data slices. For example, storage unit #1 is receiving a first encoded data slice (EDS 1_1) of the set; storage unit #2 is receiving a second encoded data slice (EDS 2_1) of the set; and so on. Note that the 1_1 associated with the EDS 1_1 corresponds to the pillar number (i.e., the first number) and the data segment number (i.e., the second number). As such, EDS 1_1, is the first pillar number of the set for a first data segment of a data file or data object being encoded.

Figure 10:
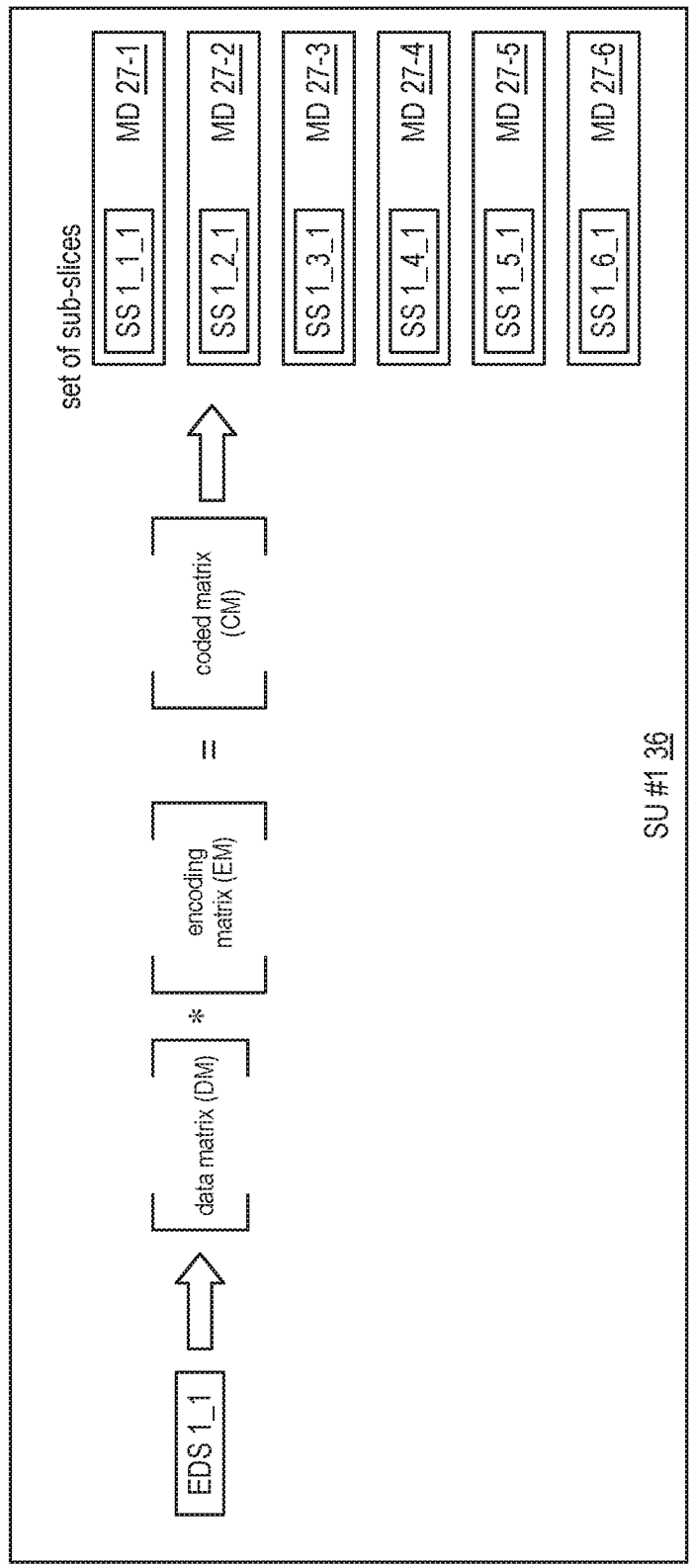
FIG. 10 is a schematic block diagram of an example of a storage unit processing an encoded data slice in accordance with the present invention.

FIG. 10 is a schematic block diagram of an example of a first storage unit (e.g., SU #1) processing a first encoded data slice (e.g., EDS 1_1). As shown, the first storage unit converts the encoded data slice into a data matrix (DM). For example, the first storage unit divides the first encoded data slice into a plurality of data blocks, which are arranged into row and columns to form the data matrix. As a specific example, the first storage unit divides the first encoded data slice into 12 data blocks and arranges the data blocks into a data matrix in a manner similar to the data matrix of FIG. 5.

With reference to FIG. 10, the first storage unit then matrix multiplies the data matrix (DM) with an encoding matrix (EM) to produce a coded matrix (CM). In this example, the coding matrix (CM) includes six rows and three columns, the data matrix (DM) includes three rows and four columns, and the coded matrix (CM) includes six rows and four columns. The resulting coded matrix is processed to produce six encoded data sub-slices (SS 1_1_1 through SS 1_6_1), with a numbering convention of pillar number_sub pillar number_data segment number.

Each encoded data sub-slice is stored in a separate memory device of the first storage unit. For example, encoded data sub-slice 1_1_1 is stored in memory device (MD) 27-1; encoded data sub-slice 1_2_1 is stored in memory device (MD) 27-2; encoded data sub-slice 1_3_1 is stored in memory device (MD) 27-3; and so on. Note that the first storage unit may further store the first encoded data slice in addition to the sub-slices. As such, when the first storage unit receives a read request for the first encoded data slice, it can use the stored copy of the slice or reconstruct it from the encoded data sub-slices. When the first storage unit only stores the sub-slices, then, for each read request for the first encoded data slice, the storage unit reconstructs it from the sub-slices.

Figure 11:
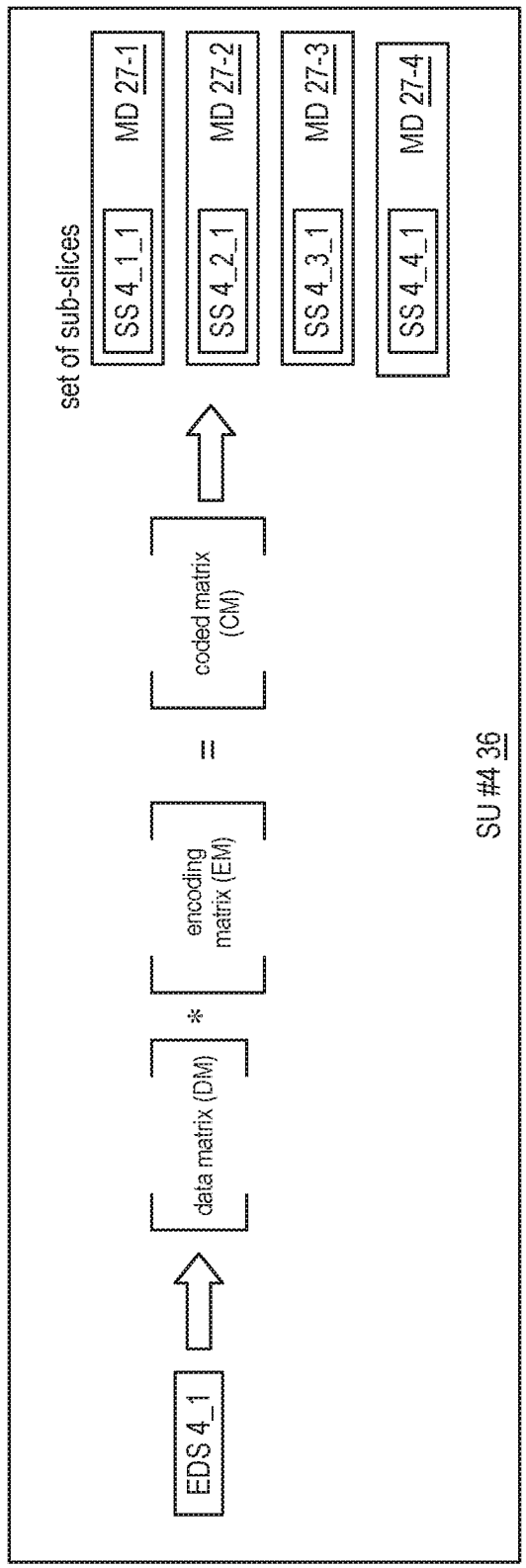
FIG. 11 is a schematic block diagram of another example of a storage unit processing an encoded data slice in accordance with the present invention.

FIG. 11 is a schematic block diagram of another example of a fourth storage unit (SU #4) processing a fourth encoded data slice (EDS 4_1). As shown, the fourth storage unit converts the encoded data slice into a data matrix (DM). For example, the fourth storage unit divides the fourth encoded data slice into a plurality of data blocks, which are arranged into row and columns to form the data matrix. As a specific example, the fourth storage unit divides the fourth encoded data slice into 12 data blocks and arranges the data blocks into a data matrix in a manner similar to the data matrix of FIG. 5.

With reference to FIG. 11, the fourth storage unit then matrix multiplies the data matrix (DM) with an encoding matrix (EM) to produce a coded matrix (CM). In this example, the coding matrix (CM) includes four rows and three columns, the data matrix (DM) includes three rows and four columns, and the coded matrix (CM) includes four rows and four columns. The resulting coded matrix is processed to produce four encoded data sub-slices (SS 4_1_1 through SS 4_4_1), with a numbering convention of pillar number_sub pillar number_data segment number.

Each encoded data sub-slice is stored in a separate memory device of the first storage unit. For example, encoded data sub-slice 4_1_1 is stored in memory device (MD) 27-1; encoded data sub-slice 4_2_1 is stored in memory device (MD) 27-2; encoded data sub-slice 4_3_1 is stored in memory device (MD) 27-3; and encoded data sub-slice 4_4_1 is stored in memory device (MD) 27-4. Note that the fourth storage unit may further store the fourth encoded data slice in addition to the sub-slices. As such, when the fourth storage unit receives a read request for the fourth encoded data slice, it can use the stored copy of the slice or reconstruct it from the encoded data sub-slices. When the fourth storage unit only stores the sub-slices, then, for each read request for the fourth encoded data slice, the storage unit reconstructs it from the sub-slices. Note that, from storage unit to storage unit, each may perform a different level of encoding (i.e., use a different encoding matrix and/or organize the data matrix differently). Variances in encoding used by the storage units may be based on the number of memory devices within the storage unit, the type of memory devices, the age of the memory devices, etc.

Figure 12:
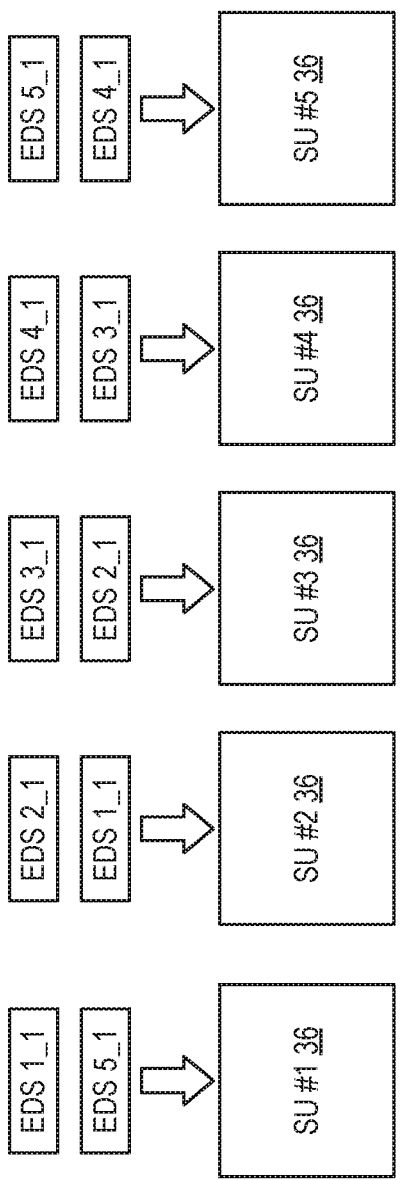
FIG. 12 is a schematic block diagram of an example of storage units receiving two encoded data slices for processing in accordance with the present invention.

FIG. 12 is a schematic block diagram of an example of storage units receiving two encoded data slices for processing and storing. In this example, the first storage unit (SU #1) receives encoded data slices EDS 1_1 and EDS 5_1; the second storage unit (SU #2) receives encoded data slices EDS 1_1 and EDS 2_1; storage unit (SU #3) receives encoded data slices EDS 3_1 and EDS 2_1; storage unit (SU #4) receives encoded data slices EDS 4_1 and EDS 3_1; and storage unit (SU #5) receives encoded data slices EDS 5_1 and EDS 4_1. As shown, each encoded data slice is provided to two storage units for processing and storage, which is discussed with reference to FIG. 13.

Figure 13:
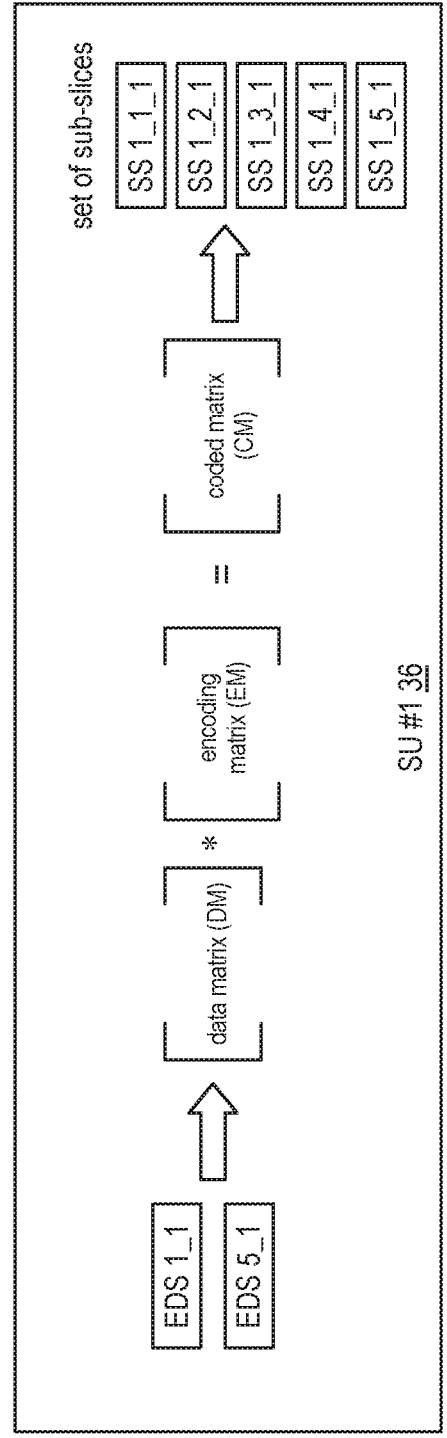
FIG. 13 is a schematic block diagram of an example of a storage unit processing two encoded data slices in accordance with the present invention.

FIG. 13 is a schematic block diagram of an example of a first storage unit processing two encoded data slices EDS 1_1 and EDS 5_1. As shown, the first storage unit converts the first and fifth encoded data slices into a data matrix (DM). For example, the first storage unit divides the first and fifth encoded data slices into a plurality of data blocks, which are arranged into row and columns to form the data matrix. As a specific example, the first storage unit divides the first and fifth encoded data slices into 12 data blocks and arranges the data blocks into a data matrix in a manner similar to the data matrix of FIG. 5.

With reference to FIG. 13, the first storage unit then matrix multiplies the data matrix (DM) with an encoding matrix (EM) to produce a coded matrix (CM). In this example, the coding matrix (CM) includes five rows and three columns, the data matrix (DM) includes three rows and four columns, and the coded matrix (CM) includes five rows and four columns. The resulting coded matrix is processed to produce five encoded data sub-slices (SS 1_1_1 through SS 1_5_1), with a numbering convention of pillar number_sub pillar number_data segment number.

Each encoded data sub-slice is stored in a separate memory device of the first storage unit. For example, encoded data sub-slice 1_1_1 is stored in memory device (MD) 27-1; encoded data sub-slice 1_2_1 is stored in memory device (MD) 27-2; encoded data sub-slice 1_3_1 is stored in memory device (MD) 27-3; and so on. Note that the first storage unit may further store each of the first and fifth encoded data slices in addition to the sub-slices. As such, when the first storage unit receives a read request for the first and/or fifth encoded data slices, it can use the stored copy of the slice(s) or reconstruct one or both of them from the encoded data sub-slices. When the first storage unit only stores the sub-slices, then, for each read request for the first and/or fifth encoded data slices, the storage unit reconstructs one or both from the sub-slices.

Figure 14:
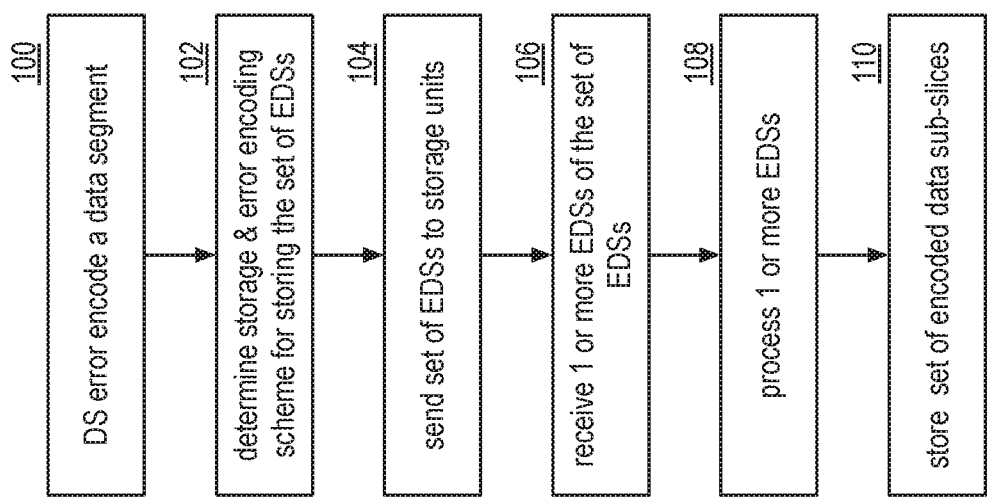
FIG. 14 is a logic diagram of an example of a method of encoding and storing a data segment in accordance with the present invention.

FIG. 14 is a logic diagram of an example of a method of encoding and storing a data segment that begins at step 100 where a computing device of a dispersed storage network (DSN) dispersed storage error encode a data segment of a data file to produce a set of encoded data slices. For example, the computing device is one or more of computing devices 12-16 of FIG. 1 and performs the encoding of the data segment as shown in FIGS. 3-5. The method continues at step 102 where the computing device determines a storage & error encoding scheme for storing the set of encoded data slices in a set of storage units of the DSN. For example, the computing device determines to store each encoded data slice as a set of encoded data sub-slices only. As another example, the computing device determines to store each encoded data slice as a set of encoded data sub-slices and to store a copy of the encoded data slice.

The method continues at step 104 where the computing devices sends the set of encoded data slices to the set of storage units in accordance with the storage & error encoding scheme. The method continues at step 106 where a first storage unit of the set of storage units receives one or more encoded data slices of the set of encoded data slices. For example, the first storage unit receives a first encoded data slice of the set of slices. In another example, the first storage unit receives a first and a fifth encoded data slice of the set.

The method continues at step 108 where the first storage unit processes the one or more encoded data slices in accordance with a first version of the storage & erroring encoding scheme to produce a first set of encoded data sub-slices. For example, the first storage unit processes a first encoded data slice as discussed with reference to FIG. 10. As another example, the first storage unit processing a first and a fifth encoded data slice as discussed with reference to FIGS. 12 and 13. The method continues at step 110 where the first storage unit stores the first set of encoded data sub-slices in a set of memory devices of the first storage unit. Note that the first storage unit may further store the first encoded data slice of the one or more encoded data slices. Further note that a threshold number of encoded data sub-slices of the first set of encoded data sub-slices is decodable to recover the first encoded data slice.

Once the first and/or fifth encoded data slices have been processed and stored (e.g., as a copy thereof and/or as a set of sub-slices), the first storage unit may receive a read request for the first and/or fifth encoded data slices. If the storage unit is storing a copy of the encoded data slice and it is free of errors (i.e., no disk errors, bit errors, bad sector, disk block, write error, read error, malfunction which causes a portion of the written data to be corrupted, and/or is not stored in a bad memory device), the storage unit provides the copy in response to the read request.

If, however, the copy of the encoded data slices is not error-free, the storage unit reconstructs or rebuilds the encoded data slice from the set of encoded data sub-slices. The storage unit provides the reconstructed encoded data slice in response to the read request.

Figure 15:
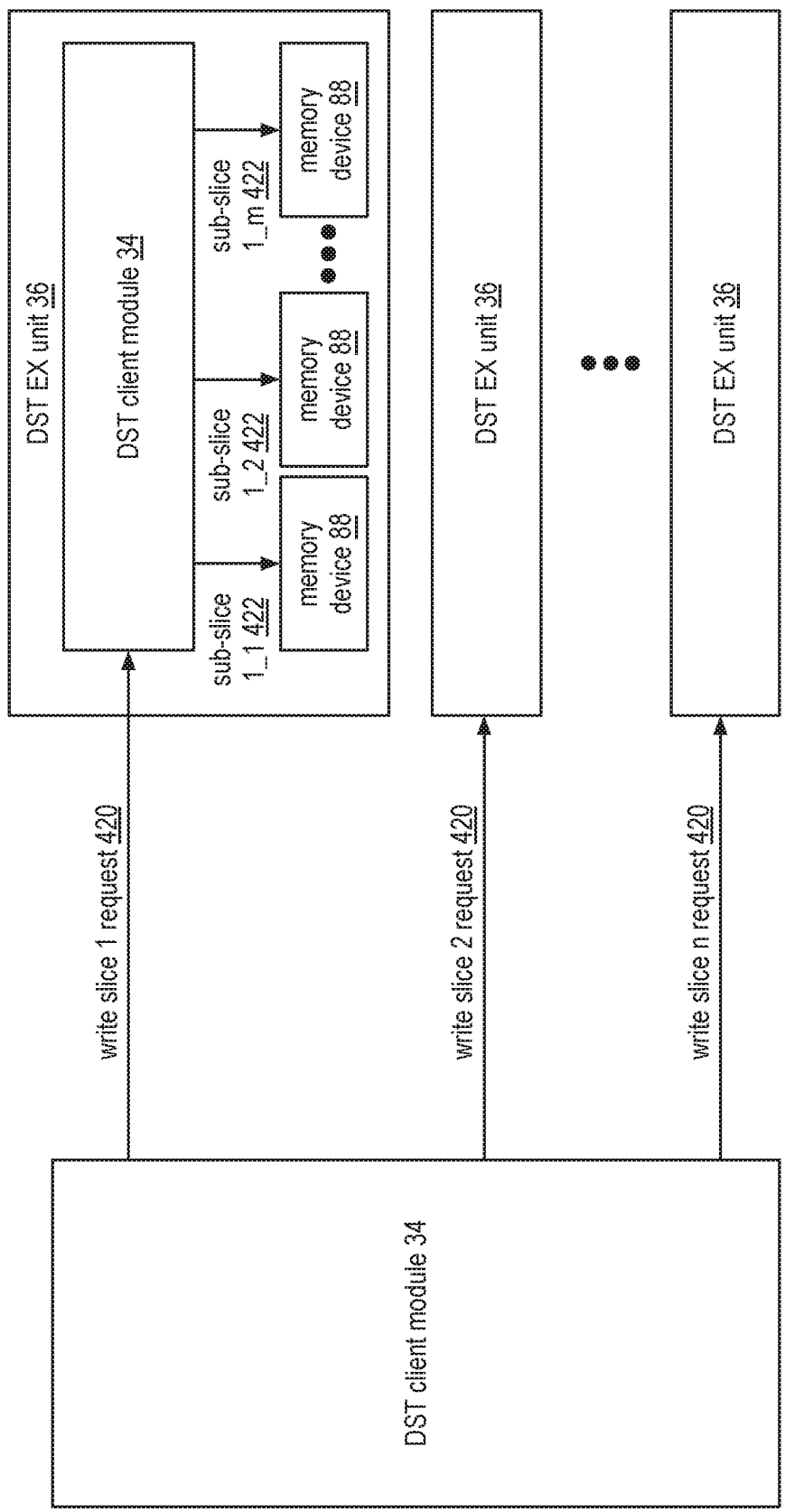
FIG. 15 is a schematic block diagram of an example of encoding and storing a data segment in accordance with the present invention.

FIG. 15 is a schematic block diagram of an example of encoding and storing a data segment within a distributed computing system that includes the distributed storage and task (DST) client module 34 and a set of DST execution units 36 of (e.g., storage units). Each DST execution unit 36 includes a DST client module 34 and a plurality of memory devices 88. The system functions to store data as slices 422 in the memory devices 88 of each of the DST execution units 36.

In an example of operation, the DST client module 34 segments the data to produce a plurality of data segments. The DST client module 34 encodes each data segment using a dispersed storage error coding function in accordance with dispersal parameters to produce a set of encoded data slices. The DST client module 34 determines the dispersal parameters based on one or more of a number of DST execution units 36 of the set of DST execution units, a sub-slicing capability of the set of DST execution units 36, and a reliability level of the set of DST execution units 36. For example, the DST client module 34 determines a pillar width number (e.g., number of DST execution units of the set of DST execution units) to be seven when seven DST execution units 36 of the set of DST execution units 36 indicates a favorable sub-slicing capability level.

The DST client module 34 generates a set of write slice requests 1-n 420 that includes the set of encoded data slices. The DST client module 34 outputs the set of write slice requests 1-n 420 to the set of DST execution units 36. For each DST execution unit 36, a corresponding DST client module 34 determines second dispersal parameters based on one or more of a number of memory devices 88, a reliability level of the memory devices 88, an available capacity level of the memory devices 88, and a memory device 88 loading level. For example, the DST client module 34 of the DST execution of 36 determines a pillar width of the second dispersal parameters to be six when six memory devices 88 are associated with a favorable reliability level (e.g., above a minimum reliability threshold level).

The DST client module 34 of the DST execution unit 36 encodes an encoded data slice of a corresponding write slice request 420 using the dispersed storage error coding function in accordance with the second dispersal parameters to produce a set of encoded data sub-slices. The DST client module 34 of the DST execution unit 36 stores the set of encoded data sub-slices in corresponding memory devices 88 of the DST execution unit 36. The method to store the data is discussed in greater detail with reference to FIG. 43B.

FIG. 16 is a flowchart illustrating an example of encoding and storing data. The method begins at step 424 where a first distributed storage and task (DST) client module selects a set of DST execution units. The selecting may be based on one or more of a lookup, receiving identities of the set of DST execution units, and sub-slicing capabilities of the set of DST execution units. The method continues at step 426 where the first DST client module determines first dispersal parameters. The determining may be based on one or more of a number of DST execution units of the set of DST execution units, sub-slicing capability of the set of DST execution units, and a reliability level of the set of DST execution units.

The method continues at step 428 where the first DST client module encodes a data segment using a dispersed storage error coding function in accordance with the first dispersal parameters to produce a set of encoded data slices. The method continues at step 430 where the first DST client module outputs the set of encoded data slices to the set of DST execution units. The method continues at step 432 where the first DST client module stores storage information with regards to the set of DST execution units. The storage information includes one or more of identities of the set of DST execution units, slice names corresponding to the set of encoded data slices, the first dispersal parameters, and a vault identifier (ID) associated with the data segment. The storing includes storing the storage information in at least one of a local memory and the set of DST execution units.

The method continues at step 434 where a second DST client module receives an encoded data slice of the set of encoded data slices. The method continues at step 436 where the second DST client module selects a set of memory devices. The selecting may be based on one or more of a lookup, receiving memory device identifiers, a memory device reliability level, a memory device available storage capacity level, and a memory device available input/output capacity level. The method continues at step 438 where the second DST client module determines second dispersal parameters. The determining may be based on one or more of a number of memory devices of the set of memory devices, the memory device reliability level, the memory device available storage capacity level, the memory device available input/output capacity level, and the first dispersal parameters. For example, the second DST client module selects a pillar width to be substantially the same as the number of memory devices of the set of memory devices.

The method continues at step 440 where the second DST client module encodes the encoded data slice using the dispersed storage error coding function in accordance with the second dispersal parameters to produce a set of encoded data sub-slices. The method continues at step 442 where the second DST client module stores the set of encoded data sub-slices in the selected set of memory devices. The method continues at step 444 where the second DST client module stores second storage information with regards to the selected set of memory devices. The storing includes generating the second storage information to include one or more of identities of the set of the selected memory devices, the slice name, the second dispersal parameters, the vault ID, and sub-slice names corresponding to the set of encoded data sub-slices. The storing further includes storing the second storage information in at least one of a local memory, at least one of the memory devices of the set of memory devices, and the set of DST execution units.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    dispersed storage error encoding, by a computing device of a dispersed storage network (DSN), a data segment of a data file to produce a set of encoded data slices;
    determining, by the computing device, a storage & error encoding scheme for storing the set of encoded data slices in a set of storage units of the DSN;
    sending, by the computing device, the set of encoded data slices to the set of storage units in accordance with the storage & error encoding scheme;
    receiving, by a first storage unit of the set of storage units, one or more encoded data slices of the set of encoded data slices;
    processing, by the first storage unit, the one or more encoded data slices in accordance with a first version of the storage & error encoding scheme to produce a first set of encoded data sub-slices, wherein the first version of the storage & error encoding scheme is based on a set of memory devices of the first storage unit; and
    storing, by the first storage unit, the first set of encoded data sub-slices in the set of memory devices of the first storage unit, wherein each encoded data sub-slice of the first set of data sub-slices is stored in a separate memory device of the set of memory devices of the first storage unit.

2. The method of claim 1 further comprises:
    storing, by the first storage unit, a first encoded data slice of the one or more encoded data slices, wherein a threshold number of encoded data sub-slices of the first set of encoded data sub-slices is decodable to recover the first encoded data slice.

3. The method of claim 2 further comprises:
    receiving, by the first storage unit, a read request for the first encoded data slice from a requesting device;
    determining, by the first storage unit, whether the stored version of the first encoded data slice is error free;

when the stored version of the first encoded data slice is not error free, rebuilding, by the first storage unit, the first encoded data slice from the threshold number of encoded data sub-slices; and sending, by the first storage unit, the rebuilt first encoded data slice to the requesting device.

4. The method of claim 1 further comprises:

receiving, by the first storage unit, a read request for a first encoded data slice of the one or more encoded data slices from a requesting device;

rebuilding, by the first storage unit, the first encoded data slice from the threshold number of encoded data sub-slices; and sending, by the first storage unit, the rebuilt first encoded data slice to the requesting device.

5. The method of claim 1 further comprises:

receiving, by a second storage unit of the set of storage units, a second one or more encoded data slices of the set of encoded data slices;

processing, by the second storage unit, the second one or more encoded data slices in accordance with a second version of the storage & error encoding scheme to produce a second set of encoded data sub-slices, wherein the second version of the storage & error encoding scheme is based on a set of memory devices of the second storage unit; and storing, by the second storage unit, the second set of encoded data sub-slices in the set of memory devices of the second storage unit, wherein each encoded data sub-slice of the second set of data sub-slices is stored in a separate memory device of the set of memory devices of the second storage unit.

6. The method of claim 5 further comprises:

the first version of the storage & error encoding scheme including a first dispersed storage error encoding function, wherein a pillar number of the first dispersed storage error encoding function corresponds to a number of memory devices of the set of memory devices of the first storage unit; and the second version of the storage & error encoding scheme including a second dispersed storage error encoding function, wherein a pillar number of the second dispersed storage error encoding function corresponds to a number of memory devices of the set of memory devices of the second storage unit.

7. The method of claim 1, wherein the processing the one or more encoded data slices comprises:

dispersed storage error encoding, by the first storage unit, a first encoded data slice of the one or more encoded data slices using a first dispersed storage error encoding function of the first version of the storage & error encoding scheme to produce the first set of encoded data sub-slices.

8. The method of claim 1 further comprises:

receiving, by the first storage unit, first and second encoded data slices of the set of encoded data slices as the one or more encoded data slices;

generating, by the first storage unit, a data matrix from the first and second encoded data slices;

matrix multiplying, by the first storage unit, the data matrix with an encoding matrix to produce a coded matrix; and storing, by the first storage unit, portions of the coded matrix in the set of memory devices as the first set of encoded data sub-slices.

9. The method of claim 8 further comprises:

receiving, by the first storage unit, a read request for at least one of the first and second encoded data slices from a requesting device of the DSN;

recovering, by the first storage unit, the data matrix from the coded matrix and a decoding matrix;

recovering, by the first storage unit, the least one of the first and second encoded data slices from the data matrix; and sending, by the first storage unit, the recovered at least one of the first and second encoded data slices to the requesting device.

10. A computer readable storage device comprises:

a first storage section that stores operational instructions that, when executed by a computing device of a dispersed storage network (DSN), causes the computing device to:

dispersed storage error encode a data segment of a data file to produce a set of encoded data slices;

determine a storage & error encoding scheme for storing the set of encoded data slices in a set of storage units of the DSN; and send the set of encoded data slices to the set of storage units in accordance with the storage & error encoding scheme;

a second storage section that stores operational instructions that, when executed by a first storage unit of the set of storage units, causes the first storage unit to:

receive one or more encoded data slices of the set of encoded data slices;

process the one or more encoded data slices in accordance with a first version of the storage & error encoding scheme to produce a first set of encoded data sub-slices, wherein the first version of the storage & error encoding scheme is based on a set of memory devices of the first storage unit; and store the first set of encoded data sub-slices in the set of memory devices of the first storage unit, wherein each encoded data sub-slice of the first set of data sub-slices is stored in a separate memory device of the set of memory devices of the first storage unit.

11. The computer readable storage device of claim 10, where the second storage section further stores operational instructions that, when executed by the first storage unit, causes the first storage unit to:

store a first encoded data slice of the one or more encoded data slices, wherein a threshold number of encoded data sub-slices of the first set of encoded data sub-slices is decodable to recover the first encoded data slice.

12. The computer readable storage device of claim 11 further comprises:

a third storage section further stores operational instructions that, when executed by the first storage unit, causes the first storage unit to:

receive a read request for the first encoded data slice from a requesting device;

determine whether the stored version of the first encoded data slice is error free;

when the stored version of the first encoded data slice is not error free, rebuild the first encoded data slice from the threshold number of encoded data sub-slices; and send the rebuilt first encoded data slice to the requesting device.

13. The computer readable storage device of claim 10 further comprises:

a third storage section further stores operational instructions that, when executed by the first storage unit, causes the first storage unit to:
receive a read request for a first encoded data slice of the one or more encoded data slices from a requesting device;
rebuild the first encoded data slice from the threshold number of encoded data sub-slices; and
send the rebuilt first encoded data slice to the requesting device.

14. The computer readable storage device of claim 10 further comprises:
a third storage section further stores operational instructions that, when executed by a second storage unit of the set of storage units, causes the second storage unit to:
receive a second one or more encoded data slices of the set of encoded data slices;
process the second one or more encoded data slices in accordance with a second version of the storage & error encoding scheme to produce a second set of encoded data sub-slices, wherein the second version of the storage & error encoding scheme is based on a set of memory devices of the second storage unit; and
store the second set of encoded data sub-slices in the set of memory devices of the second storage unit, wherein each encoded data sub-slice of the second set of data sub-slices is stored in a separate memory device of the set of memory devices of the second storage unit.

15. The computer readable storage device of claim 14 further comprises:
the first version of the storage & error encoding scheme including a first dispersed storage error encoding function, wherein a pillar number of the first dispersed storage error encoding function corresponds to a number of memory devices of the set of memory devices of the first storage unit; and
the second version of the storage & error encoding scheme including a second dispersed storage error encoding function, wherein a pillar number of the second dispersed storage error encoding function corresponds to a number of memory devices of the set of memory devices of the second storage unit.

16. The computer readable storage device of claim 10, where the second storage section further stores operational instructions that, when executed by the first storage unit, causes the first storage unit to process the one or more encoded data slices by:
dispersed storage error encoding a first encoded data slice of the one or more encoded data slices using a first dispersed storage error encoding function of the first version of the storage & error encoding scheme to produce the first set of encoded data sub-slices.

17. The computer readable storage device of claim 10, where the second storage section further stores operational instructions that, when executed by the first storage unit, causes the first storage unit to:
receive first and second encoded data slices of the set of encoded data slices as the one or more encoded data slices;
generate a data matrix from the first and second encoded data slices;
matrix multiply the data matrix with an encoding matrix to produce a coded matrix; and
store portions of the coded matrix in the set of memory devices as the first set of encoded data sub-slices.

18. The computer readable storage device of claim 17 further comprises:
a third storage section further stores operational instructions that, when executed by a second storage unit of the set of storage units, causes the second storage unit to:
receive a read request for at least one of the first and second encoded data slices from a requesting device of the DSN;
recover the data matrix from the coded matrix and a decoding matrix;
recover the least one of the first and second encoded data slices from the data matrix; and
send the recovered at least one of the first and second encoded data slices to the requesting device.

\* \* \* \* \*